US008913130B2

(12) United States Patent
Gabel

(10) Patent No.: US 8,913,130 B2
(45) Date of Patent: Dec. 16, 2014

(54) ADJUSTMENT SECURING MEANS FOR MONITORING CAMERAS

(75) Inventor: Oliver Gabel, Reichenbach-Steegen (DE)

(73) Assignee: Mobotix AG, Winnweiler (DE)

( * ) Notice: Subject to any disclaimer, the term of this patent is extended or adjusted under 35 U.S.C. 154(b) by 319 days.

(21) Appl. No.: 13/122,155

(22) PCT Filed: Sep. 29, 2009

(86) PCT No.: PCT/DE2009/001355
§ 371 (c)(1),
(2), (4) Date: Jul. 12, 2011

(87) PCT Pub. No.: WO2010/037367
PCT Pub. Date: Apr. 8, 2010

(65) Prior Publication Data

US 2011/0261196 A1 Oct. 27, 2011

(30) Foreign Application Priority Data

Oct. 1, 2008 (DE) ........................ 10 2008 049 872

(51) Int. Cl.
*H04N 7/18* (2006.01)
*G08B 13/196* (2006.01)
*G08B 29/04* (2006.01)

(52) U.S. Cl.
CPC ...... *G08B 13/19606* (2013.01); *G08B 13/1963* (2013.01); *G08B 13/19632* (2013.01); *G08B 29/046* (2013.01)
USPC .......................................... 348/143; 348/E07

(58) Field of Classification Search
CPC .................... G08B 13/19606; G08B 13/1963; G08B 13/19632; G08B 29/046
USPC ........................................................ 348/143
See application file for complete search history.

(56) References Cited

U.S. PATENT DOCUMENTS

| | | | | |
|---|---|---|---|---|
| 3,993,866 | A * | 11/1976 | Pearl et al. | 348/151 |
| 4,080,629 | A * | 3/1978 | Hammond et al. | 348/373 |
| 4,815,757 | A * | 3/1989 | Hamilton | 280/764.1 |
| 6,011,925 | A * | 1/2000 | Hosoe | 396/50 |
| 6,215,519 | B1 * | 4/2001 | Nayar et al. | 348/159 |
| 6,965,397 | B1 | 11/2005 | Honey et al. | |

(Continued)

FOREIGN PATENT DOCUMENTS

| | | |
|---|---|---|
| DE | 198 56 619 | 6/2000 |
| DE | 10 2005 037 534 | 3/2006 |
| WO | 00 35188 | 6/2000 |
| WO | 02 03700 | 1/2002 |

OTHER PUBLICATIONS

International Search Report issued Feb. 22, 2010 in PCT/DE09/01355 filed Sep. 29, 2009.

*Primary Examiner* — Dave Czekaj
*Assistant Examiner* — Asmamaw G Tarko
(74) *Attorney, Agent, or Firm* — Oblon, Spivak, McClelland, Maier & Neustadt, L.L.P.

(57) ABSTRACT

The invention relates to a monitoring camera arrangement, having at least one setting axis for setting a monitoring region and a detection means in order to be able to capture and signal changes of the monitoring region. According to the invention, the detection means comprises at least one monitoring image-independent tilt detector in order to signal a monitoring region change in response to detected tilt changes.

12 Claims, 1 Drawing Sheet

(56) References Cited

U.S. PATENT DOCUMENTS

Figure 1:
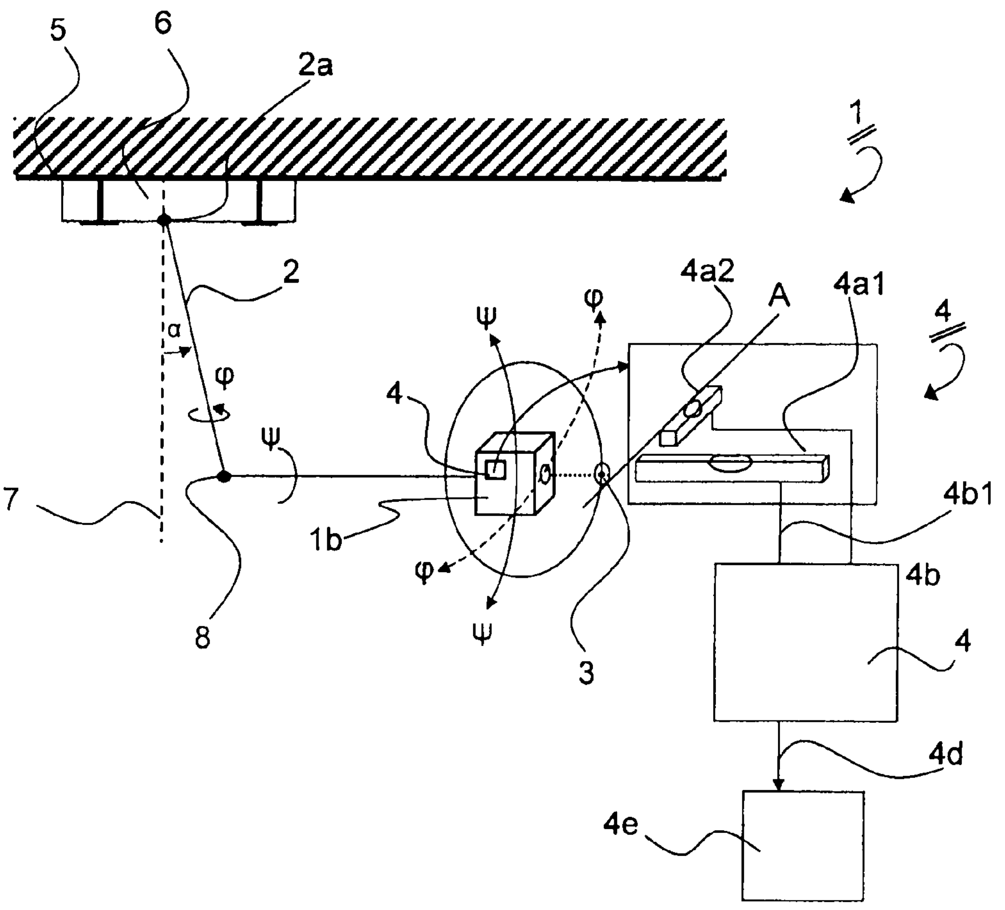

| | | | | |
|---|---|---|---|---|
| 7,236,200 | B2 * | 6/2007 | Vernon | 348/370 |
| 7,868,911 | B2 * | 1/2011 | Park | 348/143 |
| 7,899,209 | B2 * | 3/2011 | Greiffenhagen et al. | 382/103 |
| 2002/0014971 | A1 | 2/2002 | Ferraro | |
| 2004/0032492 | A1 * | 2/2004 | Wada et al. | 348/143 |
| 2006/0055778 | A1 * | 3/2006 | Ito | 348/143 |
| 2006/0092317 | A1 * | 5/2006 | Elnicky | 348/373 |
| 2006/0098092 | A1 * | 5/2006 | Park | 348/143 |
| 2008/0274798 | A1 * | 11/2008 | Walker et al. | 463/25 |
| 2009/0207250 | A1 * | 8/2009 | Bennett et al. | 348/144 |
| 2010/0253792 | A1 * | 10/2010 | Kawaguchi et al. | 348/208.2 |
| 2010/0265331 | A1 * | 10/2010 | Tanaka | 348/159 |
| 2013/0050406 | A1 * | 2/2013 | Morimoto | 348/37 |

* cited by examiner

ADJUSTMENT SECURING MEANS FOR MONITORING CAMERAS

The present invention relates to what is claimed in the preamble and, therefore, to how an undesired variation in a monitored region can be avoided in the case of monitoring cameras.

Monitoring cameras frequently serve the purpose of monitoring a fixed region that is defined when the camera is initially mounted before monitoring, and is intended thereafter to be as far as possible no longer changed. This holds both for monitoring cameras that are to remain absolutely fixedly aligned during monitoring, and to cameras that are intended to pivot to and fro during monitoring in order to monitor the scanned viewing region repeatedly.

After an initial, correct alignment, changes are possible through deliberate sabotage or intervention by a third party, or else owing to random events such as strong wind, birds and the like that land on the camera and take off therefrom again; such random events prove to be disruptive, in particular, when the camera has not been fixed in an optimum way during mounting, for example because screws that fix the setting have not been tightened sufficiently strongly by a user.

It is possible in principle to detect an adjustment by viewing images or else by automated image evaluation. However, by way of example this encounters its limitations when the changes are only slight, but the monitoring of the edge regions as well is of particular importance. This can be a case, however, with railroad tracks. Moreover, problems arise when there is a need for image recognition under changing environmental conditions or in places where it encounters difficulties because, for example, few horizontal or vertical lines are present in the image, for example in the case of large places and/or because relevant lines are frequently covered owing to public traffic undergoing many changes.

It is already known to monitor the inclination of cameras by integrating inclination switches in the camera housing. Known inclination switches are relatively insensitive and, moreover, do not impede pivoting of the housing, and so manipulations cannot be excluded.

It is desirable to be able to specify a protection against adjustment that contributes to increasing the reliability of monitoring cameras.

The object of the present invention consists in providing something novel for commercial application.

This object is achieved as claimed independently. Preferred embodiments are to be found in the subclaims.

Thus, the invention proposes a monitoring camera arrangement having at least one setting axis for setting a monitoring region and a tilt detector in order to be able to detect and signal variations in the monitoring region, after mounting the setting axis being an axis not perpendicular to the setting of a generally horizontal viewing direction, and the tilt detector being designed to the effect that in response to detected tilt variations it is possible to signal a variation in the horizontal monitoring region.

Thus, it is firstly proposed to detect the tilt of the camera independently of a monitoring image in order to detect pivoting. To this end, the camera arrangement is designed so that the (generally horizontal) pivot axis is slightly inclined when mounted as usual. Each pivot movement then leads to a tilt which—although small—can be verified straightaway with the aid of inclination detectors. Pivoting can therefore be detected with particular ease simply by detecting an inclination of the pivot axis. Adjusting about the pivot axis certainly then no longer leads to an adjustment of the viewing direction exactly along the horizontal, but the arrangement is particularly advantageous in asmuch as adjusting the pivoting direction now leads to a variation in the inclination, and this can be effectively detected independently of the monitoring image by a tilt detector as a change in tilt.

This contributes to being able to quickly and reliably detect changes in an original setting without complex image evaluation. At the same time, the use of tilt detectors also renders it possible for gradual variations to be more reliably detected.

It is particularly preferred to use the invention with monitoring camera arrangements in the case of which a setting is possible in two directions, that is to say an inclination movement and/or a pivoting movement are provided. The invention is thus in no way limited to camera movements in a rotating direction.

When the camera is tiltable, it is preferred for the inclination joint to be arranged between the pivot axis and the camera; this has constructional advantages. In this case, the pivot axis is understood as that axis about which the camera is to be varied in general along the horizontal in order to set a viewing direction; this setting will not take place in an exactly horizontal fashion, because the appropriate axis is inclined.

The setting axis will typically be a pivot axis that in the mounted state is inclined to be vertical or is skewed in relation to the latter, something which can be achieved by virtue of the fact that the setting axis does not project orthogonally from the camera housing and is not arranged orthogonally on a fastening plane such as a wall.

In order to ensure that the setting axis is inclined sufficiently far from the vertical, that is to say from the plumb line, and/or is adequately skewed in relation to the latter, it is possible to provide a mounting plate for fitting the camera from which plate the pivot axis projects, the pivot axis deliberately being arranged to be skewed in relation to the rear side of the mounting plate. It is ensured in this way that the inventive design results as desired.

The use of an appropriate mounting plate is particularly preferred because it ensures a preferred mounting in the simplest way. In a particularly preferred variant, the inclination of the pivot axis to the vertical will be above 3°, preferably above 5°, but less than 15°, preferably not more than 10°, these data relating to an inclined pivot axis, and specifying the angle of the pivot axis to the vertical in a plane that contains both the pivot axis and the vertical. The specified amplitudes are preferred because, on the one hand, the inclination is not allowed to be too small because otherwise the inventively preferred inclination of the pivot axis can no longer be achieved in spite of the mounting plate when the base plate is not aligned upright with sufficient exactitude. If, by contrast, the inclination of the pivot axis is too large, setting becomes difficult because then a change around the pivot axis is accompanied at the same time by strong tilting or inclination of the image. As long as the pivot axis inclination is not too large, although these effects likewise occur they are tolerable. These considerations also indicate how large the inclination is to be when the pivot axis is one that lies skewed in relation to the vertical.

It is particularly preferred when the camera comprises a correction means for correcting images recorded at a tilt. In other words, a rotation of the image can be provided were a skewed image to have been displayed on an upright monitor owing to the inclined position of the pivot axis. This can already be performed electronically in the camera so that vertical images are always output irrespective of an observation point, and this is much more convenient for monitoring purposes.

It may be pointed out that wherever the camera repeatedly scans a monitoring region by being pivoted or inclined to and fro, the tilt detector can be designed to determine a variation occurring in the tilt for a given scanning angle, for example the middle position. This can be performed in a simple way by a middle switch or by measuring the scanning period between two extremes and halving the value so that there is no pressing need for a goniometer. It may be pointed out that given the presence of a correction means for correcting images recorded at a tilt, the correction means can be designed to correct the tilt undergoing change during a scanning movement.

The tilt detector can be designed as an electromechanical component. In particular, it can be designed as an electronically operating water level or spirit level. In a preferred variant, two tilt detectors are provided that detect mutually nonparallel tilts that are preferably orthogonal to one another. It is particularly preferred to provide three tilt detectors that are preferably mutually nonparallel in pairs and preferably define a Cartesian coordinate system. This simplifies the evaluation of detector signals.

It is possible to evaluate the characteristic of a tilt detector signal. Thus, it will be a more critical task to assess a slight but lasting tilt than, for example, short-term vibrations owing to wind or hail. It is, moreover, possible to balance the tilt detector signal characteristic against the signal profile of a detector that is fastened in a stationary fashion upon fitting of the camera, that is to say is not moved together with a pivoting or inclining movement of the camera. This is particularly advantageous wherever the camera is moved strongly overall and can be exposed by this movement to inclinations, for example on ships where cargo holds are to be monitored. Here, it can be established via compensation of the tilt detector signals between the ship's hull and the camera whether the camera is being inclined together with the ship's hull owing to the movement of the ship or whether inclination relative to the ship is taking place. This holds similarly for motor vehicles, railroad vehicles and aircraft.

It is possible to retrofit existing cameras in accordance with the invention. Mounting sets with a base plate that effects an inclination of the pivot axis and with tilt detectors can be provided to this end. By way of example, tilt detectors suitable for retrofitting can feed their signals via suitable interfaces to the camera that is to be retrofitted itself, or directly to a data line also addressed by the camera.

Figure 2:
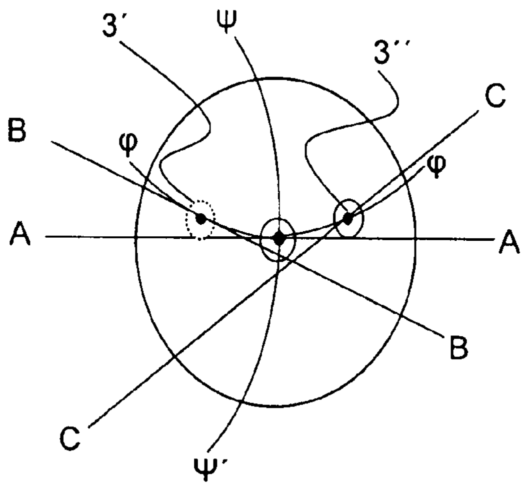

The invention is described below merely in an exemplary fashion with the aid of the drawing, in which:

FIG. 1 shows a monitoring camera arrangement in accordance with the present invention, and FIG. 2 shows representations of the setting of a camera viewpoint in the field of view of the monitoring camera arrangement of FIG. 1.

According to FIG. 1, a monitoring camera arrangement denoted in general by 1 comprises at least one setting axis 2 for setting a monitoring region 3, and a detection means 4 in order to be able to detect and signal variations in the monitoring region, the detection means 4 comprising at least one tilt detector 4*a* that is independent of the monitoring image in order to be able to signal a variation in monitoring region in response to detected variations in tilt.

In the present exemplary embodiment, the monitoring camera arrangement 1 is a permanently installed monitoring camera that is mounted on a generally horizontal building ceiling 5 with the aid of a mounting plate 6. The monitoring camera arrangement 1 is connected via a data line to a remotely located control center for supplying images, in order to be able to ensure permanent monitoring of the monitoring region 3, which is illustrated here in an extremely reduced fashion on purpose for reasons of clarity in presentation. The monitoring camera arrangement comprises signal transmission means suitable for this purpose, for example a TCP/IP interface or the like, via which it is also possible to transmit tilt detector signals, compare 4*b*1, 4*b*2.

The pivot axis 2 serves the purpose of pivoting the camera, that is to say of moving it along the line A-A in FIG. 2. The pivot axis 2 has hinged joints 2*a* corresponding thereto on the mounting plate. The pivot axis 2 is now inclined at an angle $\alpha$ to the vertical 7. This is achieved in a simple way by virtue of the fact that the axis is not perpendicular to the mounting plate 6. In a particularly preferred variant of the invention, use is made for this purpose of a wedge shaped mounting plate that can also be formed in two parts; it is then possible to use a wedge shaped underpiece that is mounted under a conventional mounting plate (with pivot axis projecting perpendicularly therefrom), in order to obtain, overall a pivot axis that is not orthogonal to a ceiling.

As illustrated in FIG. 2, upon rotation of the camera by an angle $\phi$ about the pivot axis 2, the viewing region 3 of the camera therefore moves not along the horizontal line A-A, but along the curved line $\phi$-$\phi$.

An inclination joint 8 is arranged on the pivot axis in a fashion spaced apart from the mounting plate 6 so that the camera 1*b* of the monitoring camera arrangement 1 not only can be pivoted along the line $\phi$-$\phi$, but can also be inclined along the line $\psi$-$\psi$.

The tilt detectors 4*a*1 and 4*a*2 are arranged in the housing of the camera 1*b* and therefore participate in each movement of the camera housing 1*b*. They are emphasized in FIG. 1 solely for reasons of illustration. It is shown schematically in this case that the tilt detectors are illustrated as a water level arrangement, specifically composed of two mutually orthogonal water levels 4*a*1 and 4*a*2.

A practical implementation of the tilt detectors illustrated as water levels can be achieved by means of acceleration sensors of conventional design. Specifically, not only do these acceleration sensors respond, as a rule, when their state of movement changes markedly, but they are sensitive enough to detect differences in the action of the Earth's gravitational field that are associated with variations in their inclined position. The use of acceleration sensors is, moreover, therefore also preferred because they can be used to verify short, hard impacts, blows etc.; during the monitoring of the camera function, this assists not only in avoiding manipulations, but also in detecting defects by blows—which do not change a setting, etc.

Each of the tilt detectors drawn here as water levels of electromechanical design can be zeroed in a desired position in which the camera has once been set up, that is to say it can be set such that no tilting signal is produced but the middle position is detected. The electromechanical water levels or tilt detectors are so precise that interfering deflections of the camera housing can be detected. The tilt detectors 4*a*1 and 4*a*2 are assigned a signal conditioning unit 4*c* in order to condition the signals 4*b*1 and 4*b*2 of the tilt detectors and, in response to variations, detected by the tilt detectors, in the degree of tilting, to output a warning signal 4*d* to a warning unit 4*e*, something which can be done via a TCP/IP or another interface via which the camera also transmits images, for example. The actual warning then takes place in the evaluation control center, but can alternately also be performed in another way such as by informing an administrator by SMS or the like.

The first step in the operation is now to set a desired position 3', compare FIG. 2, of the viewing region, and both tilt detectors 4*a*1 and 4*a*2 are set such that they do not respond, that is to say are "zeroed" at the tilting position that results (compare, in particular, the straight line B-B in FIG. 2 for illustration of the inclined position of the tilt detector 4*a*2). This can be done, for example, mechanically or else electronically. By way of example, for acceleration sensors that are preferably used, the current g value component in the desired position can be stored.

As long as no variation now takes place in the setting, the tilt detector 4*a*2 will also not respond. If, however, the camera is rotated about the axis 2, there is at the same time a change in the inclined position of the tilt detector 4*a*2 which, for example, is moved from its set position to a position 3" on the line ϕ-ϕ of FIG. 2, and therefore has an inclination c corresponding to the line C-C. This can be detected straightaway in the tilt detector signal evaluation stage 4*c*, and so a tilt signal can be output to the warning unit 4*e* via the line 4*d*.

An adjustment of the pivoting direction can be detected immediately in this way. Even given a ceiling base 5 that is slightly inclined or uneven, a sufficiently strong tilting signal can be detected with the detector 4*a*2 owing to the sufficiently large inclination α of the pivot axis 2 to the vertical 7.

It may also be pointed out that, although this is not described above, it can be undertaken to compensate an initial inclined position 3' of the image electronically, that is to say by means of software. If, as is preferred, said position is set upon mounting, said presetting no longer also changes through the pivoting—which is undesired and, possibly, caused by sabotage—of the camera housing 1*b* about the pivot axis 2 from the viewing region 3' into the viewing region 3". The undesired inclined position can therefore also be particularly well detected optically because a horizon previously represented as straight now appears tilted.

It may be pointed out that the tilt signal evaluation stage 4*c* can ignore short-term tilts, for example vibration-induced fluctuations in the middle position, or instead output if necessary a warning to display the problems of fastening, and this provides early warning of future lasting variations in the viewing region.

It may be remarked, furthermore, that the arrangement of the tilt detectors can also be used in order to be able to determine a current alignment in the case of cameras that can, in particular, be pivoted and/or inclined by electric motor. This permits independence of angle transmitters and/or of the (stepping) motor of the camera adjustment; this is perceived per se as advantageous and inventive, even if, for example, an appropriate pivot axis is arranged vertically.

The invention claimed is:

1. A monitoring camera arrangement for a surveillance camera, comprising:

at least one setting axis to set a monitoring region by pivoting about the setting axis, the setting axis being non-vertical after mounting the surveillance camera, and at least two tilt detectors to detect and signal tilt variations in monitoring region, the at least two tilt detectors detecting at least mutually nonparallel tilts wherein the setting axis is arranged such that, after mounting the surveillance camera on a level surface, the setting axis is not normal to a bearing plane thereof, at least two tilt detectors signal a variation in the horizontal monitoring region indication tampering of the surveillance camera in response to the detected tilt variations.

2. The monitoring camera arrangement as claimed in claim 1, wherein two setting axes are provided to enable an inclined setting and a pivot setting.

3. The monitoring camera arrangement as claimed in claim 1, wherein an inclination joint is arranged between the at least one setting axis and the surveillance camera.

4. The monitoring camera arrangement as claimed in claim 1, wherein in a mounted state the at least one setting axis is skewed in relation to vertical.

5. The monitoring camera arrangement as claimed in claim 1, further comprising:

a mounting plate to fit the surveillance camera on a level surface, in which the at least one setting axis, which is not vertical after mounting, is arranged in a fashion not normal to a bearing plane of the mounting plate.

6. The monitoring camera arrangement as claimed in claim 1, further comprising:

a pivot axis that is inclined relative to vertical or is skewed in relation to the vertical, in which the inclination is above 3°, but not more than 15°.

7. The monitoring camera arrangement as claimed in claim 1, further comprising:

correction means for correcting images recorded at a tilt.

8. The monitoring camera arrangement as claimed in claim 1, further comprising:

a drive to repeatedly scan a monitoring region, the at least two tilt detectors being designed to determine a variation in tilt for a given scanning angle.

9. The monitoring camera arrangement as claimed in claim 1, wherein the at least two tilt detectors are formed as an electromechanical component.

10. The monitoring camera arrangement as claimed in claim 1, further comprising:

evaluating means for evaluating a tilt detector signal characteristic.

11. The monitoring camera arrangement as claimed in claim 6, wherein the inclination is not more than 10°.

12. The monitoring camera arrangement as claimed in claim 1, wherein three tilt detectors detecting at least mutually nonparallel tilts in pairs are provided.

* * * * *